Jan. 8, 1929.

H. LYON 1,698,641

SCARFING MACHINE

Filed March 24, 1923   7 Sheets-Sheet 2

Fig. 2.

Inventor:
Harry Lyon
by Wright, Brown, Quinby & May
Attys.

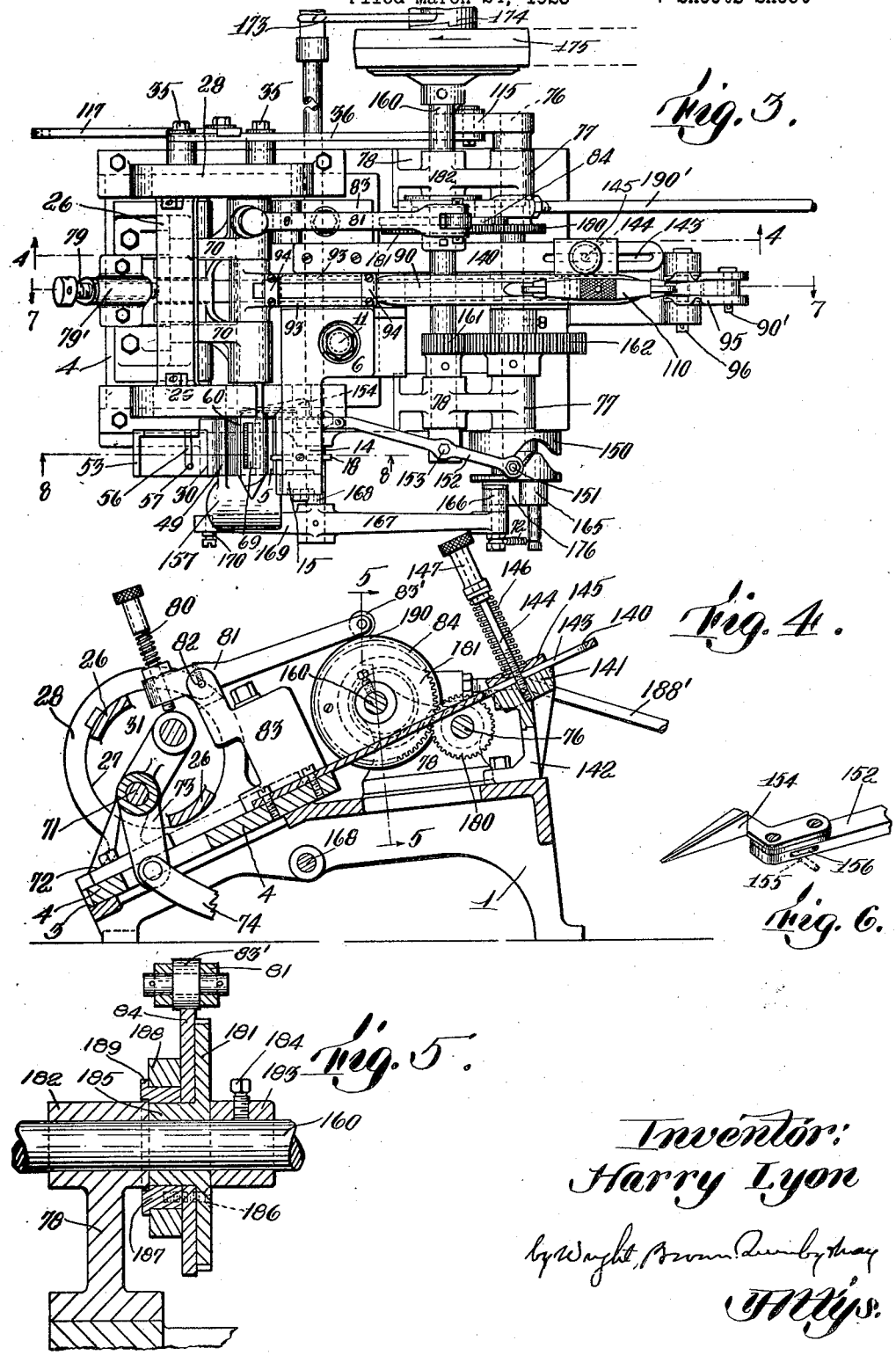

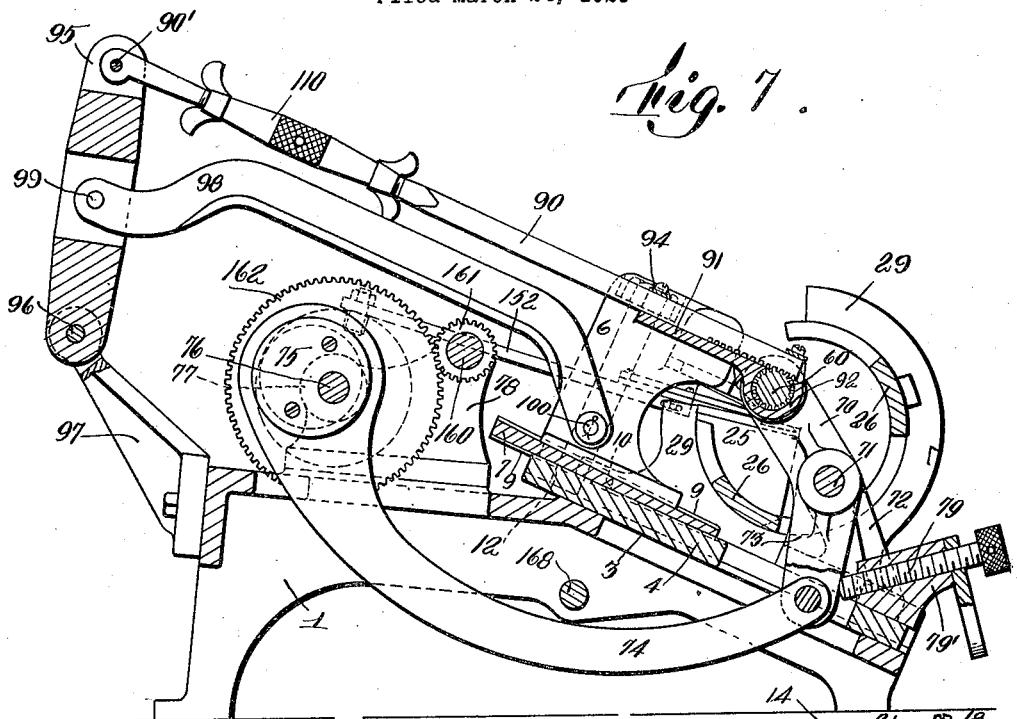
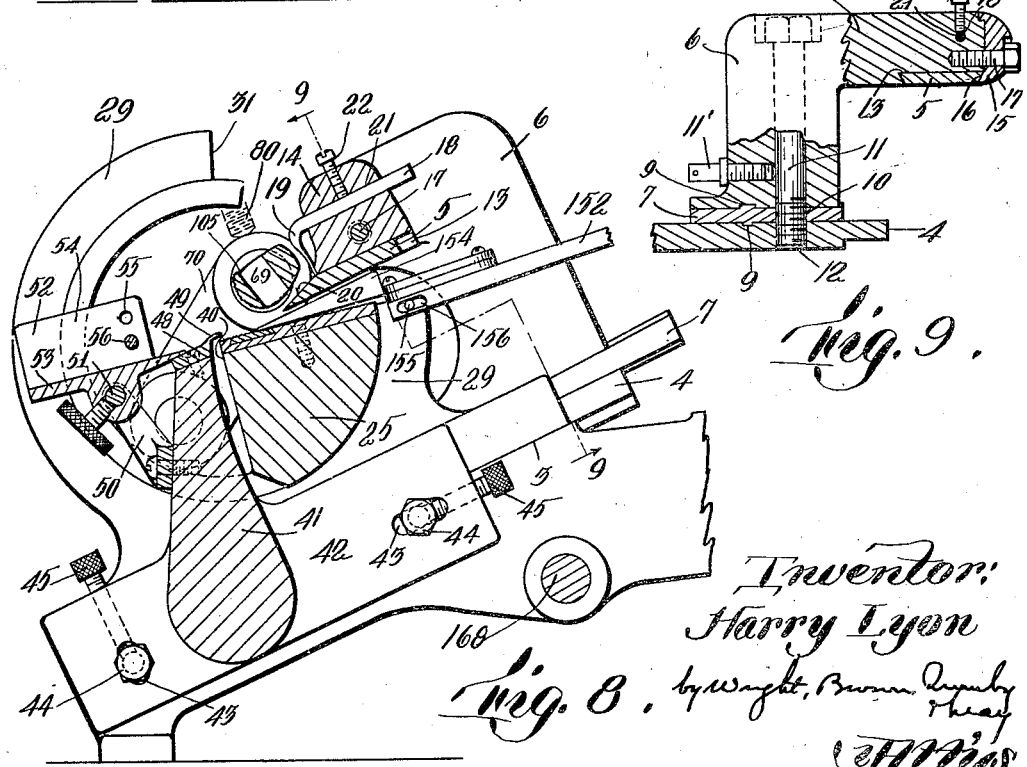

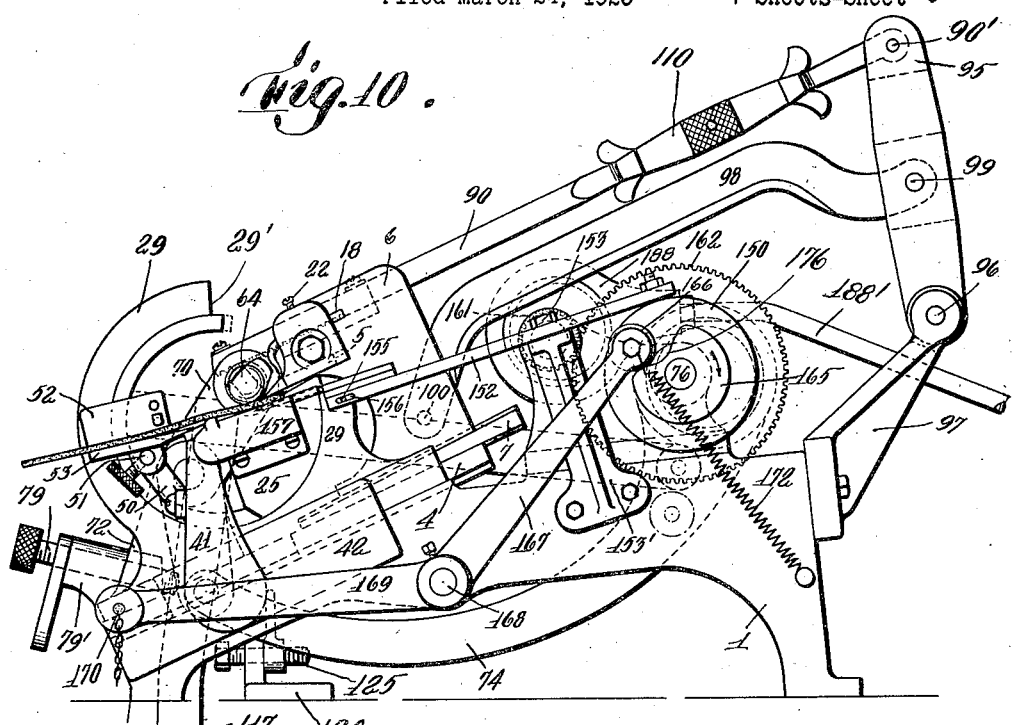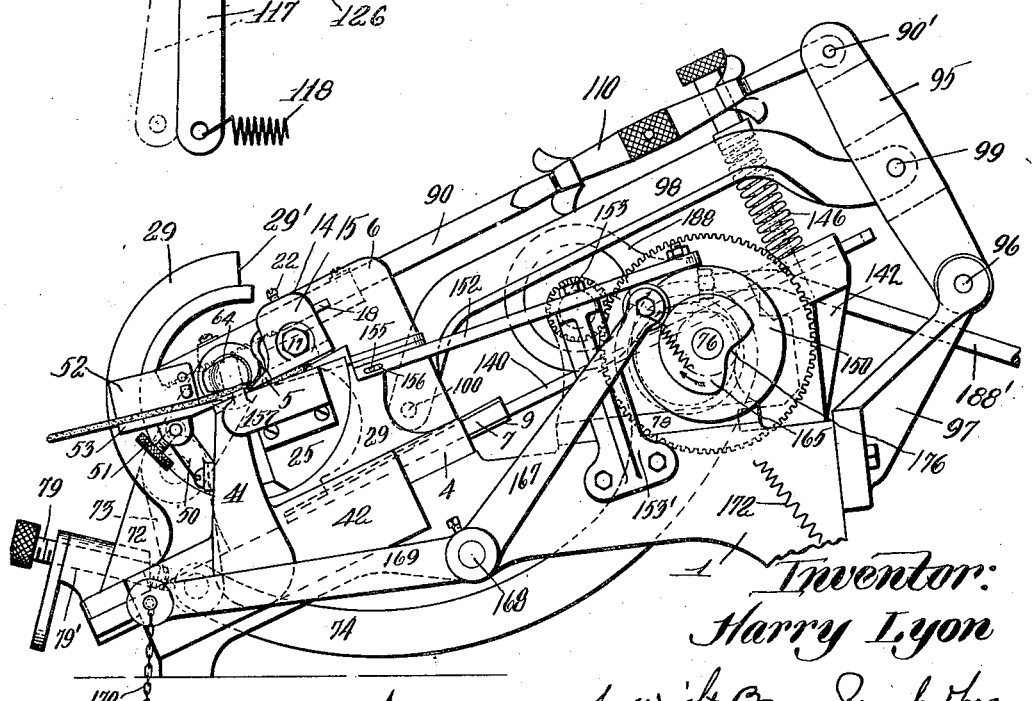

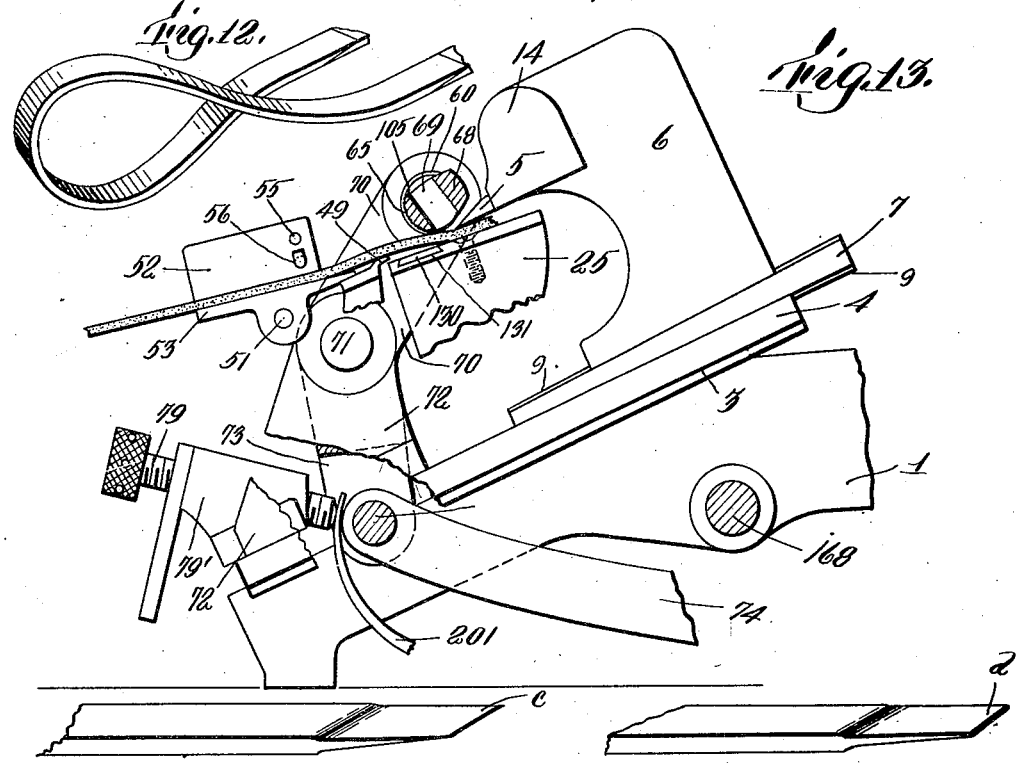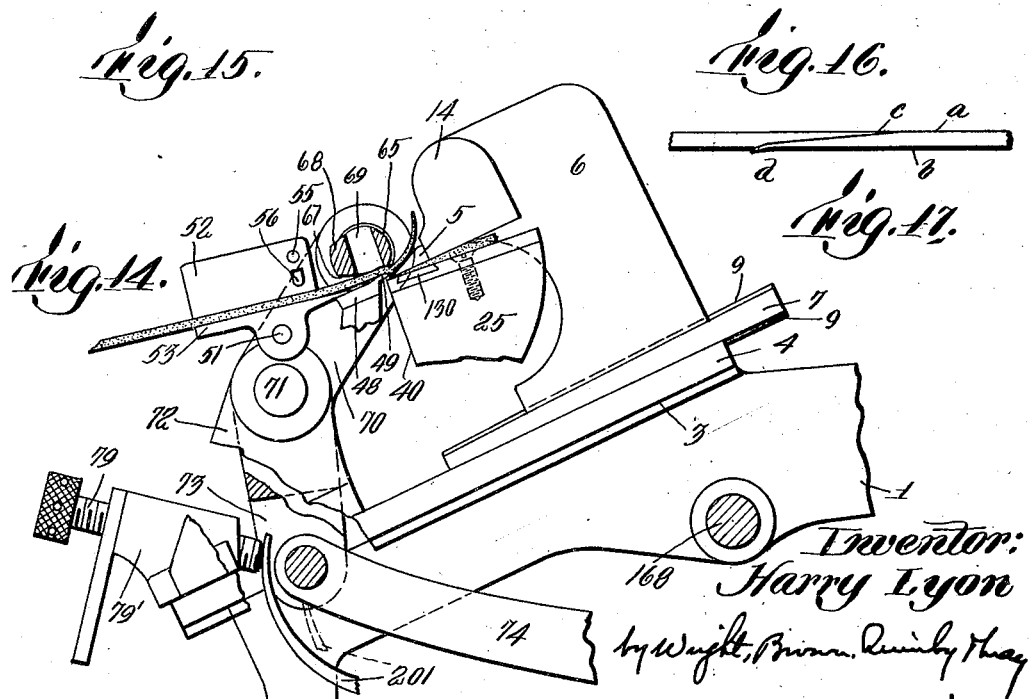

Jan. 8, 1929.  
H. LYON  
1,698,641
SCARFING MACHINE
Filed March 24, 1923  7 Sheets-Sheet 7
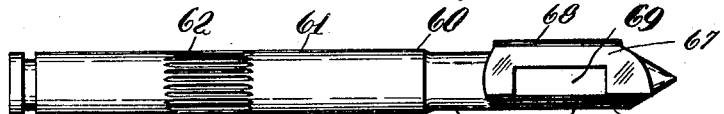
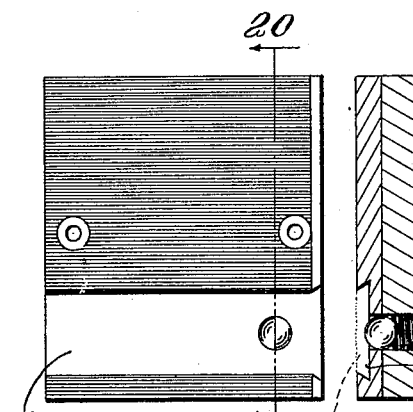
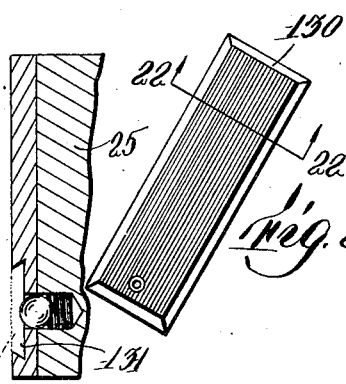
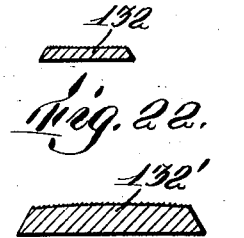
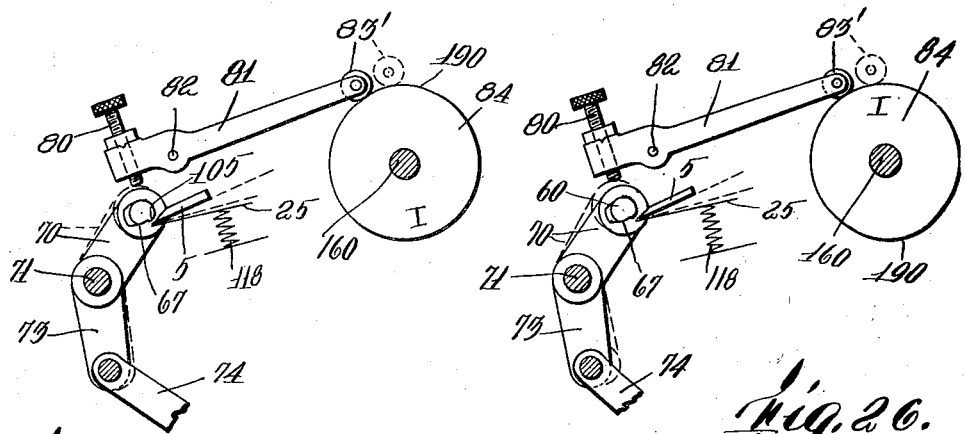
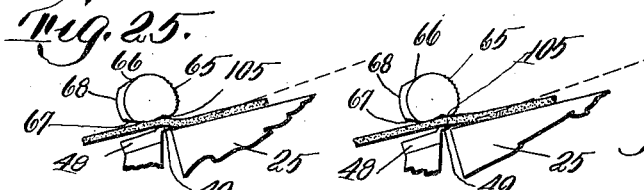
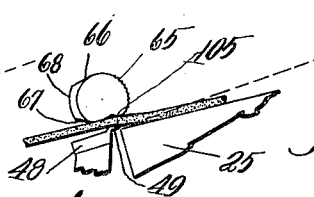
Inventor:  
Harry Lyon  
by Wright, Brown, Quinby & May  
Attys.

Patented Jan. 8, 1929.

1,698,641

UNITED STATES PATENT OFFICE.

HARRY LYON, OF BROCKTON, MASSACHUSETTS, ASSIGNOR TO JOHN A. BARBOUR, OF BROOKLINE, MASSACHUSETTS, AND PERLEY E. BARBOUR, OF QUINCY, MASSACHUSETTS, A COPARTNERSHIP DOING BUSINESS AS BARBOUR WELTING COMPANY, OF BROCKTON, MASSACHUSETTS.

SCARFING MACHINE.

Application filed March 24, 1923. Serial No. 627,322.

This invention relates to scarfing machines particularly intended for beveling the ends of strips such as those from which "endless" leather welting is made preparatory to cementing them together to form a continuous length.

Heretofore the scarfing has been effected by starting the cut from one face of the stock in an inclined direction facing the end of the piece so that the knife emerges from the other face of the stock adjacent this end. When the knife emerges, however, the edge is left in a more or less ragged condition and it has therefore been necessary to trim this edge in a subsequent operation. This latter operation has been particularly important when the knife emerges from the grain side of the leather since this is the finished face of the welt, any subsequent trimming to produce material of uniform thickness being effected on the flesh side only. It is therefore very important that the scarfed end shall be cut true and clean so that a proper joint with the adjacent piece may be produced to its extreme end.

According to the present invention this end trimming operation is entirely eliminated, the clean end of the scarfed portion being assured by starting the cut at this point and directing the knife away from this end. The stock and knife are so relatively manipulated that the knife may be forced into the work by a direct inward motion under adjustable pressure and then assume its diagonal direction of motion whereby the end of the stock may be formed thin or blunt as desired and when the knife leaves the stock it is caused to leave it by a more abrupt outward motion forming a more or less pronounced shoulder against which the end of the adjacent scarfed piece may closely engage.

The machine of the present invention is designed to cut toward the operator who inserts the end of the strip in position and work-engaging devices are so formed and related that the operator is able to see the end of the work and make sure that it is properly placed before the operation of the machine is initiated.

The thickness of the thin end of the scarf is adjustable by adjusting the pressure with which the work is urged against the knife and the height of the shoulder at the opposite end of the scarfed portion may also be adjusted as will later appear. The depth of the cut and its inclination relative to the stock is also adjustable.

The machine is also so designed that it may operate properly on stock varying in hardness and as the skiving knife becomes dull from use without affecting the nature of the cut produced, these various factors being automatically taken care of by the machine to accomplish the desired results.

It is evident that in every joint formed by the overlapping scarfed portions of adjacent pieces one of the ends lies on the grain or finished side of the welt. As no further finishing operation is desired for this face of the welt, it has been found desirable to form this end of the scarfed portion thin and flexible so that bending or flexing of the strip may take place without causing any strain thereon sufficient to injure this portion of the joint. The end of the adjacent piece is correspondingly scarfed, its end being thicker and projecting on the flesh side of the welt on which a finishing cut is taken, this cut serving to thin this end from its outer surface and to lay it down firmly against its mating scarf so that a proper joint is insured on this side of the welt also when the welt is finished.

In order to effect the different cuts desired for the scarfs having their thinner ends on the grain and flesh sides, respectively, provision is made in the machine by which these ends are cut thicker and thinner alternately, suitable indications being made on the machine as to the particular form of scarf to be next effected at any particular actuation of the machine. The thicker end scarf is also cut longer than the thin end scarf in order that after the final trimming operation on the flesh side of the welt the proper joint may be formed.

For a more complete understanding of this invention, together with further objects and advantageous details and combinations of parts, reference may be had to the accompanying drawings in which Figure 1 is a right side elevation of the machine.

Figure 2 is a left side elevation of the machine.

Figure 3 is a plan of the machine head looking in the direction of the arrow 3 in Figure 1.

Figure 4 is a vertical section on line 4—4 of Figure 3.

Figure 5 is a detail section on line 5—5 of Figure 4.

Figure 6 is a detail perspective of a knock-off finger and its mounting.

Figure 7 is a vertical section on line 7—7 of Figure 3.

Figure 8 is a detail vertical section to an enlarged scale on line 8—8 of Figure 3.

Figure 9 is a detail section on line 9—9 of Figure 8.

Figures 10 and 11 are somewhat diagrammatic views, parts being omitted, showing relative positions of certain parts when the scarfing operation for a thin end scarf is about to commence and near completion, respectively.

Figure 12 is a perspective of the leather strip showing the manner in which the ends are to be scarfed.

Figures 13 and 14 are enlarged fragmentary details illustrating the positions of the strip-holding and cutting mechanism at the beginning and end, respectively, of the scarfing operation when the long blunt end scarf is to be produced.

Figures 15 and 16 are perspectives illustrating the character of the scarfed portions at opposite ends of the strip.

Figure 17 is an edge view of the joint between adjacent scarfed pieces.

Figure 18 is an elevation of the stock-clamping roller.

Figure 19 is a plan of the work table.

Figure 20 is a detail section on line 20—20 of Figure 19.

Figure 21 is a perspective of a work table surface plate.

Figure 22 is a section on line 22—22 of Figure 21.

Figures 23 and 24 are views similar to Figure 21 but on a larger scale and showing different surface contours.

Figures 25 and 26 are somewhat diagrammatic views illustrating certain parts in position for operation on opposite ends of a strip and the effect of certain adjustments.

Figures 27 and 28 are diagrammatic views illustrating the effect of varying the pressure of the clamping roller on the work adjacent the end of the cutting stroke.

Figure 1:
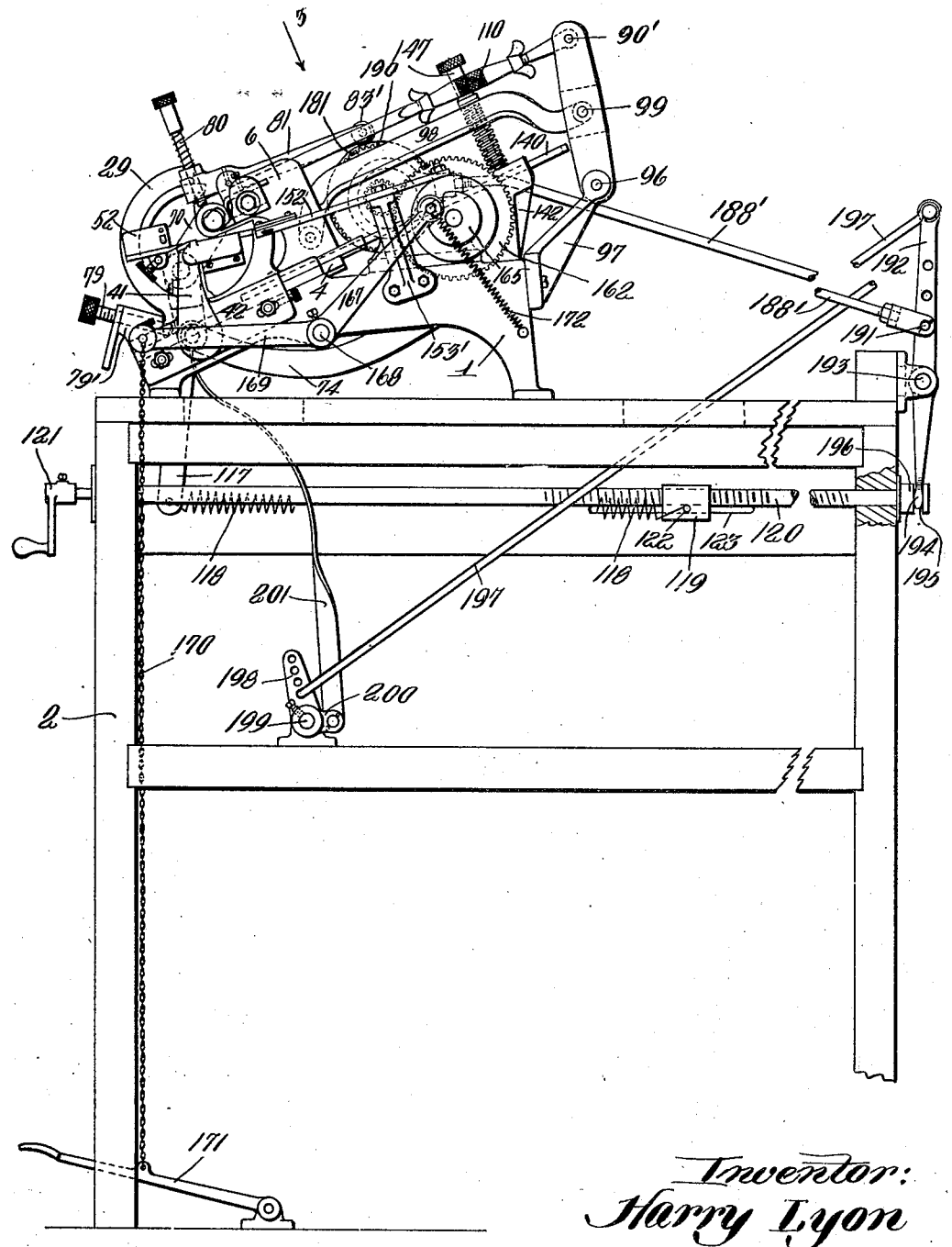

Referring to these drawings, 1 indicates a machine head which as shown is adapted to be supported by a bench or table 2. The machine head is provided with a forwardly and downwardly inclined slideway 3 (Figs. 7 and 8) for the reception of a slide 4 which is constructed to carry a scarfing knife 5. This knife is mounted on a carrier 6 projecting upwardly from the slide 4 and is adjustable vertically with relation thereto by means of a wedge 7 which extends between the upper face of the slide 4 and the lower face of the carrier 6. As shown in Figure 9 the wedge is provided with guide flanges or fins 9 on its upper and lower faces which mate corresponding grooves in the upper and lower faces of the slide and the carrier by which means relative turning of the carrier and the slide is prevented. The wedge 7 is provided with a slot 10 through which extends a bolt 11 accessible from the upper face of the carrier 6, this bolt being threaded at its lower end in an opening 12 in the slide 4. By this construction the wedge 7 may be moved lengthwise, the bolt 11 having been loosened, and provides an adjustment of the height of the knife 5 to a predetermined degree according to the distance the wedge is moved. When the adjustment has been effected the bolt 11 is tightened and then fixed in position by means of a set screw 11'.

As shown also in Figure 9 the knife has beveled side edges, one of which fits a mating beveled edge of a recess 13 in an arm 14 projecting laterally from the upper end of the carrier. A cap member 15 having a beveled edge 16 engaging the opposite edge of the knife may be bolted to the outer end of the arm 14 by means of the bolt 17. By this means the knife is held rigidly in position in the carrier. In order to determine the proper setting of the knife a gage 18 has been provided which has a downwardly turned end 19 which is adapted to indicate the proper position of the inner end of the beveled portion 20 of the knife. These knives should be ground accurately by machinery so that the inner end of the beveled portion furnishes a proper indication of the position of the cutting edge. This gage 18 as shown is a round rod and passes through a perforation 21 in the arm 14 and may be fixed in proper position by a set screw 22. By movement of the slide 4 the knife 5 is given its cutting and retracting strokes as will later appear, the cutting stroke of the knife being in a forwardly and downwardly inclined direction toward the operator.

The work is supported beneath the knife so that the knife enters adjacent its end and then follows a path inclined downwardly relative thereto and emerges from the lower face thereof back from its end for which purpose a work table 25 has been provided. This work table is mounted to oscillate about an axis lying in the plane of its top surface and for this purpose one end of the table is provided with spaced projecting webs 26 (see Figures 3, 4, and 7), terminating in cylindrical bearing surfaces journaled within a pair of spaced circular bearings 27 in brackets 28 and 29 upstanding from the machine head 1, the main portion of the work table extending laterally beyond the bracket 29 as at 30 to form the work supporting portion thereof.

The bracket 29 and the corresponding table bearing surface are cut away as at 29' to permit proper movement of the knife carrier. Within the bracket 28 the work table webs 26 are connected by a circular end portion 31 to which, as shown in Figures 2 and 3, are fixed a pair of outwardly extending bolts 35 to which is fixed an arm 36 forming a crank by means of which the work table may be oscillated as will later be described. The work supporting portion of the table is cut away as best shown at 40 in Figure 8 and extending through this cut away portion is an arm 41 upwardly projecting from a plate 42 which is adjustably fixed to one face of the head 1 by means of a pair of relatively inclined slots 43 therein through which pass bolts 44 threaded into the head and engaged by adjusting screws 45. The upper end of the arm 41 has fixed thereto a plate 48 having an edge member 49 which projects slightly over the adjacent edge of the work table top. This edge member 49 is so positioned that at the limit of the forward stroke of the knife 5 this knife passes thereunder, the edge formed by the cut away portion of the work table coinciding with its pivotal axis. The work table, therefore, may be rocked so that its rear edge approaches or recedes from the knife 5 without affecting the relation between the cutting edge of the knife and the forward edge of the work table as defined by the cutout portion 40. To the forward face of the arm 41 is fixed a bracket 50 having a pivot 51 at its upper end on which is mounted a gage member 52. This gage member has a flat work supporting face 53, the rear end of which rests on the top of the plate 48 and also has an upstanding side wall 54 which serves as an edge gage to determine the lateral position of the strip which is to be scarfed. This upstanding wall 54 may be perforated at one or more places as shown at 55 for the selective reception of a pin 56, the outer end of which may be upturned as shown at 57 in Figure 3, and beneath which the work may be placed, this pin cooperating with the gage to properly position the work on the work table.

Provision is also made for pressing the work strip down against the work table to hold it during the cutting stroke of the knife, this holding means also performing an additional function in bending the work over the edge member 49 to provide a shoulder at the inner limit of the scarfed portion against which the end of the mating scarfed portion of the adjacent strip may abut to make a close joint. As shown this holding means comprises a roller 60 which is shown in detail in Figure 18. This roller comprises a cylindrical shaft 61 having gear teeth 62 cut therein intermediate its length. One end 64 of this roller is of reduced diameter having a cylindrical portion 65, the sides of which are cut away as shown at 66 and 67 (Figs. 25 to 28). The portion 65 is preferably fluted as shown and is of the same diameter as the pitch diameter of the toothed portion 62. Opposite the portion 65 the roller may be laterally elongated as shown at 68, this portion having no bearing on the work at any time and being extended to provide sufficient stock so that the roller may be provided with a rectangular perforation 69 therethrough transverse to its axis adjacent the cylindrical portion 65 for a purpose which will later appear. The welt pressing roller 60 is journaled in a pair of spaced arms 70 (Figs. 3, 7, 25 and 26) of a bell crank lever fulcrumed on a shaft 71 carried in a bracket 72 (Fig. 4) fixed to the upper face of the slide 4. The other arm of the bell crank lever is formed by two spaced depending members 73 between which is pivoted the forward end of an arm 74, the rear end of which is enlarged (Figure 7) and is journaled on an eccentric 75 carried by an actuating shaft 76. This shaft is journaled in suitable bearings 77 (Figures 3 and 7) carried by brackets 78 made fast to the upper face of the head 1 at the rear of the inclined slideway 3. On motion of this eccentric the bell crank arms 70 are alternately depressed and raised, the depression of these arms carrying the roller 60 toward the surface of the work until stopped thereby or by the impingement of the forward end of the arm 74 on an adjustable stop screw 79 carried by a bracket 79' fixed to the forward edge of the slide. When the downward motion of the roller 60 is thus stopped further motion of the arm 74 in the same direction is then transmitted to the slide 4 in a direction to move the knife 5 forwardly and downwardly toward the axis of oscillation of the work table and beneath the edge member 49. When the eccentric 75 on the next half of its rotation pulls rearwardly on the arms 73 of the bell crank lever, the roller 60 is raised from the work until one of the arms 70 strikes the lower end of an adjusting screw 80 (Figs. 4, 25 and 26) threaded in the end of a lever 81 (see also Fig. 3) pivoted at 82 to a bracket 83 also fixed to the slide 4, the rear of this lever having journaled thereon a cam roller 83' resting upon a cam 84 (Fig. 5). As soon as the outward movement of the bell crank arm 70 is thus stopped further motion of the eccentric 75 then acts to pull the slide 4 backwardly up the inclined slideway thus effecting a retracting stroke of the knife 5.

Assuming that the stop screw 79 is so set that the roller 60 may be brought down on the work the pressure of the roller on the work will therefore be dependent on the resistance to the sliding downwardly and forwardly of the slide 4, this resistance being dependent on the resistance encountered by the knife in cutting the stock due to the hardness of the stock or the dullness of the knife or both,—that is, the greater the resistance encountered by the slide, the greater the pressure exerted on the stock by the roller 60. On the return stroke of the knife, however, since the first action of the eccentric is to raise the roller from the work, the amount to which the knife is retracted depends on the extent to which the roller is permitted to rise since the entire back stroke of the eccentric is expended in accomplishing these two actions. By restricting the movement of the roller from the work it is evident that more of the stroke of the eccentric must be expended in retracting the slide and hence the retracting stroke of the knife will be made correspondingly longer.

Provision is made for rotating the roller 60 while in engagement with the work so that the work may be held firmly against the work table without any tendency for the roller to move the work thereover. For this reason the teeth 62 on the roller have been provided with a pitch diameter equal to the diameter of the active portion 65 of the roller. These teeth 62 mesh with the teeth of a rack bar 90 which is slidably carried by a guide member 91 having its forward and lower end formed as a sleeve 92 (Figure 7) within which the roller 60 is journaled. This guide member has upstanding sides 93 (Fig. 3), between which the rack bar 90 moves and at suitable places straps 94 bridge these walls to retain the rack bar in position with its teeth meshing with the teeth 62 of the roller 60. For the purpose of imparting motion to this rack bar at the proper speed for effecting a true rolling contact of the roller on the work, this rack bar 90 is pivoted at its upper rear end at 90′ to a lever 95 journaled at its lower end as at 96 on a bracket 97 projecting upwardly from the rear end of the head 1. Half way between the pivot 96 and the pivot 90′ is pivoted the rear end of an arm 98 as at 99, the forward end of this arm being pivoted at 100 to the knife carrier 6. As the slide moves, therefore, the lever 95 is swung about its pivot 96 and since the pivot 90′ is twice the distance of the pivot 99 from the fulcrum 96 the rack bar is given a movement of twice the rate of the slide. As the roller 60 when down on the work travels bodily with the slide, relative motion of the rack bar and the teeth 62 takes place at the same rate as that of the slide, thus causing the surface 65 of the roller to roll on the work at the surface speed of the slide whereby true rolling contact of the roller thereon is produced.

As before noted the roller is formed to bend the work over the edge member 49, this being for the purpose of causing the knife to emerge from the work more or less sharply as may be desired. For this purpose one edge of the surface portion 65 terminates in a shoulder 105 (Figs. 8 and 18) which when the roller is adjacent the edge 49 may be positioned opposite thereto so that the work is pressed therebetween in the manner clearly shown in Figures 27 and 28. In order that this shoulder 105 may be properly related to the edge element 49 provision is made for adjusting the rotational position of the roller when in cooperative relation thereto, this means comprising a turnbuckle of any suitable description positioned in the length of the rack bar 90 as at 110.

When the work is inserted in the machine as before stated it is passed rearwardly beneath the pin 56 of the gage 53 over the edge element 49 and beneath the knife 5. It is also evident that it passes beneath the roller 60 and in order that the operator may be able to see the work in order to position it properly between the cutting edge of the knife and the upper face of the table the slot 69 above referred to has been provided. This is regarded as a very important feature of this invention since it enables the operator to make sure that the stock has been properly placed in the machine before the scarfing operation is started. As the strips come from the hide they are longer at one edge than at the other as shown in Figure 12. It is therefore an easy matter to place the strip in position under the knife so that the forward edge of the knife comes against the upper face of the work adjacent the shorter edge, the stock projecting therebeyond at the longer edge furnishing sufficient material to insure the proper engagement of the knife edge therewith before the start of the cutting operation. When the work is so inserted the work table is held rocked slightly downward to provide a space beneath the edge of the knife in its retracted position in which the end of the work may be readily positioned. As the machine starts the work table is then rocked upwardly to press the work against the knife, the same action serving to force the knife downwardly into the surface of the stock. This action of the work table is produced in the present machine by the arm 36 above referred to (Figures 2 and 3), the rear end of which carries a cam roll 115 engageable with an edge cam 116 at one end of the shaft 76. The cam roll is held up against this cam by means of an arm 117 fixed to the arm 36 and to the lower end of which is fixed one end of a contractile spring 118. When the machine is at rest before the start of the cutting operation the cam roll 115 rests on the high point of the cam 116 which holds the work table rocked to maintain a space between the knife and the upper face thereof for the insertion of the work. As soon as the machine starts the cam roll 115 rides off the high point of the cam 116 thus permitting the spring 118 to pull the arm 117 rearwardly and rock the work table so as to push the work against the knife edge. The pressure with which this spring acts may be adjusted and for this purpose the rear end of the spring 118 is shown as fixed to a block 119 threaded on a screw rod 120 which is mounted in the bench or table 2 and projects forwardly thereof where it is provided with a handle 121 by which the rod may be rotated to position the block 119 lengthwise thereof. A pin 122 projecting from the block and riding in a slot 123 in the table holds the block from rotating with the rod. The greater the pressure exerted by the spring 118 the harder the work table is rocked upwardly toward the knife and the deeper the knife sinks into the work. By this means the thickness of the end of the scarf may be determined. In order that the table may not strike the knife if no work is placed therebetween a stop screw 125 (Fig. 2) may be adjustably threaded in a bracket 126 fixed to the table or bench in position to limit the rearward movement of the arm 117.

As before noted the pressure of the roll 60 on the work determines the sharpness with which the stock is bent about the edge member 49 and on this sharpness depends the character of the opposite end of the scarf, this being clearly shown in Figures 27 and 28. In Figure 27 the pressure of the roll is considerable so that the work is pressed down against the edge of the work table closely adjacent the edge member 49, consequently the knife emerges from the work at this bent portion and forms a comparatively thick end to the scarfing. When the pressure of the roll is comparatively light, as shown in Figure 28, the work is not pressed tightly against the work table and the knife therefore emerges from the lower surface to form a comparatively thin end.

It is also desirable to control the character of the cut between its ends. For this purpose the upper face of the work table may be formed by any one of a plurality of interchangeable face plates 130 (Figs. 13 and 14) which may be dovetailed and fit in a dovetailed groove 131 in the upper face of the work table. These work plates may have their work-engaging faces formed with various contours as shown in Figures 22 to 24. For example in Figure 22 the work-engaging face 132 is flat, the work-engaging face 132′ in Figure 23 is slightly convex, while the corresponding face 132$^a$ in Figure 24 is concave. The face plates 130 can of course be changed only when the machine is at rest. The thickness of the thin end of the scarfed portion may be adjusted while the machine is in motion by turning the handle 121 (Fig. 2). The thickness at the thick end of the scarf portion is determined, as before noted, by the pressure of the roller 60 on the work which is determined by the resistance to sliding motion of the slide 4. While adjustment of this is effected automatically by varying resistance offered by the work to the knife, provision is also made by which it may be increased further as occasion may require. This is accomplished in the present instance by means of a friction plate 140 (Figures 1, 2, 3, and 4) which is made fast at its forward end to the slide and projects over a guide 141 at the upper end of a bracket 142 upstanding from the rear end of the head 1. This plate 140 is slotted as shown at 143 and through this slot passes the lower end of a screw 144 threaded in the guide 141. This screw also passes through a perforation in a friction shoe 145 overlying the side edges of the friction plate 140, this shoe being pressed against the friction plate by means of a coiled spring 146 surrounding the screw 144 and reacting between the shoe 145 and a head 147 on the screw. By turning this head the pressure of the spring 146 on the friction shoe 145 may be adjusted so as to impart an adjustable resistance to the motion of the slide in addition to that produced by the resistance of the work to the cutting stroke of the knife.

After the scarfing stroke of the knife has been effected provision is made for ejecting the scarfing from the machine. For this purpose (Figures 1 and 3) the opposite end of the shaft 76 from the cam 116 carries a grooved edge cam 150. Within the groove of this cam rides a cam follower 151 carried at the end of a lever 152 fulcrumed at 153 on a bracket 153′ made fast to the side of the head 1. The forward end of this lever 152 carries an ejector finger 154 as shown more particularly in Figure 6, this finger being of wedge shape and passing over the surface of the work table beneath the knife when the knife is in its retracted position. In order to hold this ejector finger in proper position a guide pin 155 may project laterally from the bearing 29 and pass through a slot 156 in the lever. The cam 150 is so made that a quick stroke of the ejector finger for clearing the table is made after the cutting stroke of the knife and the finger is immediately moved thereafter to its retracted position where it is out of the way of the knife. A deflector plate 157 causes the scarfing to be projected clear of the mechanism.

The machine should be so constructed that it will automatically stop after each scarfing operation with the knife retracted and the parts in position to permit the insertion of another strip end to be operated upon. For this purpose a one revolution clutch mechanism of any suitable type for the shaft 76 may be employed. In the present embodiment the drive mechanism comprises a shaft 160 journaled in the bearing brackets 78 which has fixed thereto a pinion 161 meshing with a gear 162 fixed to the shaft 76, and fixed to this shaft 76 beyond the cam 150 is a stop cam 165 (Figures 1, 3, 10 and 11). Cooperating with this stop cam is a follower 166 on a bell crank lever 167 fixed to a rock shaft 168, and to the forward arm 169 of this lever is fixed the upper end of a pull member such as a chain 170 extending to an actuating treadle 171. The cam follower is held against the edge of the cam 165 by a spring 172. The opposite end of this rock shaft 168 which is journaled in the head 1 carries a clutch actuating element 173 (Figure 3) adapted to hold a clutch 174 in position to clutch the drive pulley 175 to the shaft 160 when the treadle is depressed but permitting it to be unclutched in any suitable manner when the treadle is raised which is permitted at one portion only of the rotation of the shaft 76 by means of the depression 176 in the cam 165. The details of this clutch mechanism have not been herein shown as they are old and well known and form no part of the present invention.

The end of the scarfed portion which is exposed on the grain side of the strip should be cut very smooth and slender in order to stick closely to the scarfed portion of its adjacent strip, since this side of the strip does not receive any further finishing operation, while as before noted the end of the scarf exposed on the flesh side is preferably thicker and should overlie the adjacent portion of the mating strip so that when this surface receives its finishing cut a close fitting joint is produced. This desired condition is illustrated in Figure 17 in which the side $a$ represents the grain side of the strips as joined together and the side $b$ represents the flesh side. As herein indicated the end $c$ which is exposed on the grain side is thin and clean cut, this end portion being shown separately in Figure 15. It will also be noted that the end $d$ of the adjacent strip shown separately in Figure 16 is comparatively thick and that the scarfed portion of this piece is longer than that of the adjacent piece. As shown in Figure 12, however, one end of each strip has its scarfed end exposed on the grain side and the other on the flesh side. If then the opposite ends of the strips are to be scarfed alternately, one scarfed end should have the characteristics shown in Figure 15 being comparatively short and tapered to a sharp edge and the other should have the characteristics shown in Figure 16 being longer and having a more blunt end. Provision is therefore made in this machine by which adjustments are effected automatically so that the characteristics may be alternated in subsequent operations without requiring any attention on the part of the operator. The mechanism by which this is accomplished will now be described.

Referring more particularly to Figures 3 and 4 it will be noted that the shaft 76 has fixed thereon a pinion 180 meshing with a gear 181 which is loose on the shaft 160. As shown in Figure 5 this gear is journaled between one of the bearings 182 of the bracket 78 and a collar 183 fixed by a set screw 184 to the shaft 160. The gear 181 is provided with a hub 185 on which is carried the cam 84 above mentioned. This cam is fixed to rotate with the gear 181 by means such as a screw 186 passing through the gear 181, the cam 84 and a flanged collar 187 also mounted on the hub 185 and projecting over the end of the bearing 182. The outer face of this collar is eccentric to the shaft 160 and an eccentric strap 188 is journaled thereon being held between the flange 189 of the collar 187 and one face of the cam 84. The pinion 180 is one-half the diameter of the gear 181 wherefore the cam 84 is rotated one-half a revolution for each rotation of the shaft 76 and therefore for each actuation of the knife to perform a scarfing operation. This cam 84 has a high spot 190 on one side thereof (Figures 4, 25 and 26) and when this high spot is positioned in engagement with the cam follower 83' the lever 81 is rocked to lower the stop 80 which as before described decreases the extent to which the feed roller 60 is removed from the work prior to the initiation of the retracting stroke of the knife slide. This acts to increase the length of its retracting stroke as above described at each alternate actuation of the slide, the lever 81 riding backwardly on the surface of the cam as the slide retracts as shown by dotted lines in Figures 25 and 26. The high point of the cam is active when the scarfed ends exposed on the flesh side of the leather are being produced, while the low portion of the cam is active when the scarfed ends exposed on the grain side are being operated on. In order to indicate to the operator which type of cut is to be made in any operation a mark may be made on the cam, this being shown at the low side thereof in Figure 25. At the same time that the long scarf is to be made the outer end thereof should be made comparatively thick and for this purpose it is necessary to increase the pressure of the table upwardly at the start of the scarfing operation to cause the knife to sink deeper into the surface thereof. This is accomplished as follows. The eccentric strap 188 above mentioned journaled on the eccentric collar 187 has fixed thereto a rod 188' which extends to the rear edge of the table or bench 2 (Figures 1 and 2) and is pivoted at 191 to a lever 192 fulcrumed at 193 to the rear upper edge of this table. The lower end of the lever 192 is formed with a forked portion 194 which engages in a groove 195 of a collar 196 carried at the rear end of the screw rod 120. The eccentricity of the collar 187 is so related to the high point of the cam 84 that when the high point is in operation the rod 188' is pulled forwardly so pulling the screw 120 rearwardly and increasing the tension on the spring 118 by moving the block 119 backwardly. The handle 121 on the forward end of the screw shaft is placed sufficiently forwardly of the front face of the table to permit this action. When the thick end scarf is to be formed it is also desirable that the feed roller 60 should not press on the work adjacent its extreme end in advance of the knife since this would act to depress the surface of the material and in opposition to the spring 118 to lessen the upward pressure of the work table so that the knife would not cut as deeply as desired. For this reason the maximum movement of the roller downwardly toward the knife is arranged to be decreased at this time. For this purpose the upper end of the lever 192 has pivoted thereto a rod 197 which at its forward lower end is adjustably pivoted to one arm of a bell crank lever 198 fulcrumed at 199 to the table 2. This bell crank lever 198 has an arm 200 to which is fixed the lower end of a bar 201. The upper end of this bar 201 projects adjacent the stop 79 and when the lever 192 is rocked to increase the tension on the spring 118, the bar 201 is pushed upwardly so that its upper end passes back of the inner end of the stop 79 where it will be struck by the arm 74, thus in effect serving to change the adjustment of said stop so that the roller is not brought down against the surface of the work when the slide is started on its downward stroke to initiate the skiving operation. The position of the parts when this skiving operation starts is shown in Figure 13, the upper end of the bar 201 having been projected behind the inner end of the stop 79. It should be noted that the bell crank lever carrying the feed roller is supported by the knife slide and that the roller is in position so that if allowed to descend unchecked toward the table, it would impinge on the knife. The stop 79 prevents such action in case no stock is in position at the commencement of the skiving operation at which time it will be noted that the roller and the knife are on the same side of the work, that is, both on the upper side thereof. As the skiving action progresses the knife gradually approaches the lower face of the stock while the roller remains on the upper face thereof, consequently if the roller is permitted to closely approach the knife, it is raised upwardly from the knife by the stock as the cutting progresses so that its full pressure is exerted to bend the stock about the edge member 49 at the end of the scarfing operation. The thickness of the stock therefore determines the final distance between the roller and the knife and as the throw of the actuating eccentric for the slide and roller is divided between moving the roller and the knife slide, the final limit of the cutting stroke of the knife is variable only by the very slight differences in the thickness of the stock which determine the limit of motion of the roller toward the knife at the end of the cutting stroke. The projection of the bar 201, therefore, while preventing the roller from engaging the stock at the start of the skiving operation has no effect in changing the throw of the knife or the pressure of the roller on the work effective in bending the same about the edge member 49 since the eccentric arm 74 is not in contact with either the stop 79 or the bar 201 at the end of the cutting stroke in case any stock is in position (see Fig. 14). It will thus be seen that at each alternate operation of the machine scarfs having different characteristics are cut so that the operator has only to insert one end of each strip and then the opposite end in proper order to insure the proper scarfs being cut in each instance.

Having thus described an illustrative embodiment of this invention it should be evident that many changes and modifications might be made therein without departing from its spirit or scope as defined by the appended claims.

I claim:

1. The method of forming a beveled end on a strip which comprises cutting the strip diagonally through its thickness from adjacent one end in a direction away from said end.

2. The method of forming a beveled end on a strip which comprises cutting in on one face adjacent the end and then diagonally through the strip in a direction away from said end.

3. The method of forming a beveled end on a strip which comprises cutting into a surface thereof adjacent one end, then diagonally through its thickness in a direction away from said end, and then out through the opposite surface thereof.

4. The method of scarfing a strip which comprises forcing a knife through one surface thereof adjacent its end, passing said knife diagonally away from said end toward the opposite surface, and then more abruptly through said opposite surface.

5. The method of forming a beveled end on a strip which comprises cutting diagonally through a length of said strip while said length is held offset from the remainder of said strip to form a shoulder when said length is returned to its former condition.

6. In a machine of the class described, a work table, a scarfing knife movable in an inclined direction toward and from the surface of said table to scarf work thereon, and means acting after each scarfing operation to eject the scarfing.

7. In a machine of the class described, a work table, a scarfing knife movable in an inclined direction toward and from the surface of said table to scarf work thereon, a finger, and means for moving said finger laterally of the path of said knife over the surface of said table after each scarfing operation to eject the scarfing therefrom.

8. In a machine of the class described, a work table, a slide, a knife carrier movable with said slide to cause a knife carried thereby to move in an inclined path toward and from the surface of said table, and a wedge interposed between said carrier and slide and movable lengthwise relative thereto for preliminarily adjusting the distance of said knife from said table prior to the forward movement of said slide 9. In a welt scarfing machine, a work table, a knife movable forwardly and downwardly against the end of a welt supported on said table to form a beveled end on said welt, means for pressing the welt end against said table in advance of said knife, and a gage in advance of said pressing means for positioning the welt end relatively to said knife.

10. In a welt scarfing machine, a welt supporting table, a knife movable forwardly and downwardly into the end of a welt and in a direction toward the main body of the welt as it cuts through the welt to form a beveled end on said welt, a roller for pressing the welt against said table adjacent the cutting edge of said knife and movable therewith during its cutting stroke, and means to be engaged by said main body of the welt for locating said end in position to be scarfed.

11. In a scarfing machine, a work table, a knife movable forwardly and downwardly against said work supported on said table, and a roller for pressing the work against said table adjacent the cutting edge of said knife and rotatable forwardly therewith during its cutting stroke, said roller having a slot diametrically therethrough in position to enable the operator to see the work at said knife before the cutting stroke of the knife has been initiated.

12. In a scarfing machine, a reciprocable knife, a work table beneath said knife and pivoted on an axis substantially in the plane of motion of said knife, the cutting edge of said knife facing said axis, means for urging said table about said axis toward said knife to force the edge of said knife through the surface of work supported on said table, and means in advance of said knife edge for holding the work against the surface of said table.

13. In a scarfing machine, a reciprocable knife, a work table beneath said knife and pivoted on an axis substantially in the plane of motion of said knife, the cutting edge of said knife facing said axis, means for urging said table about said axis toward said knife to force the edge of said knife through the surface of work supported on said table, and means for adjusting the pressure with which said table is urged toward said knife.

14. In a machine of the class described, a work table, an edge member projecting above the surface of said table, a scarfing knife relatively movable toward and from the surface of said table at said edge member in a direction inclined to the surface of said table, and a roller arranged to press on work overlying said table and member in advance of said knife and movable therewith.

15. In a machine of the class described, a work table, an edge member projecting above the surface of said table, a scarfing knife relatively movable toward and from the surface of said table at said edge member in a direction inclined to the surface of said table, and a roller arranged to press on work overlying said table and member in advance of said knife and movable therewith, said roller having a shoulder thereon arranged to press the work over said edge member toward the surface of said table.

16. In a machine of the class described, a work table, an edge member projecting above the surface of said table, a scarfing knife relatively movable toward and from the surface of said table at said edge member in a direction inclined to the surface of said table, and a roller arranged to press on work overlying said table and member in advance of said knife and movable therewith, and means for rotating said roller during its movement to effect a rolling contact with the work.

17. In a machine of the class described, a work table, an edge member projecting above the surface of said table, a scarfing knife relatively movable toward and from the surface of said table at said edge member in a direction inclined to the surface of said table, a roller arranged to press on work overlying said table and member in advance of said knife and movable therewith, said roller having a shoulder thereon arranged to press the work over said edge member toward the surface of said table, means for rotating said roller during its movement to effect a rolling contact with the work, and means for adjusting the angularity of said roller to regulate the approach between said shoulder and edge member.

18. In a scarfing machine, a work table, and a knife movable in a plane at an angle to the surface of said table to scarf work held thereon, said table having a socket for selectively receiving any of a series of interchangeable elements of different surface contour by which the relation of the scarf to the surface of the work may be varied.

19. In a machine of the class described, mechanism for cutting a scarf in work, adjustable means for determining the thickness of the material adjacent one end of the scarfed portion, and adjustable means for determining the thickness of the material adjacent the opposite end of the scarf.

20. In a machine of the class described, mechanism for cutting a scarf in work, adjustable means for determining the thickness of the material adjacent one end of the scarfed portion, and means for determining the thickness of the material intermediate the ends of the scarf.

21. In a machine of the class described, mechanism for cutting a scarf in work, adjustable means for determining the thickness of the material adjacent one end of the scarfed portion, adjustable means for determining the thickness of the material adjacent the opposite end of the scarf, and means for determining the thickness of the material intermediate the ends of the scarf.

22. In a machine of the class described, a work table pivoted about an axis in its surface, a knife having its cutting edge movable in a plane including said axis toward and from said axis, an edge member projecting above the surface of said table adjacent said axis and forming a shoulder beneath which said knife edge passes as it approaches said axis, and means for engaging work overlying said table and edge closely adjacent said edge to offset the work over said edge whereby said knife may cut through the lower face of the work at an angle more obtuse than that between the plane of movement of the knife and the surface of said table.

23. In a machine of the class described, a work table pivoted about an axis in its surface, a knife having its cutting edge movable in a plane including said axis toward and from said axis, an edge member projecting above the surface of said table and forming a shoulder beneath which said knife edge passes as it approaches said axis, means for engaging work overlying said table and edge closely adjacent said edge to offset the work over said edge whereby said knife may cut through the lower face of the work at an angle more obtuse than that between the plane of movement of the knife and the surface of the table, and means for adjusting the pressure of said member on the work to vary the sharpness of said offset.

24. In a machine of the class described, an oscillatory table, a slide, a knife carried by said slide above said table and movable therewith toward and from the center of oscillation of said table, means for holding said table spaced from said knife to permit the insertion of work therebetween when said knife is in retracted position and to release said table thereafter, and resilient means urging said table toward said knife when said holding means is released to clamp the work between said knife and table and to cause said knife to sink into the work before commencement of its cutting stroke.

25. In a machine of the class described, an oscillatory table, a slide, a knife carried by said slide and movable therewith toward and from the center of oscillation of said table, means for holding said table spaced from said knife to permit the insertion of work therebetween when said knife is in retracted position and to release said table thereafter, resilient means urging said table toward said knife when said holding means is released to clamp the work between said knife and table and to cause said knife to sink into the work before commencement of its cutting stroke, and means for automatically varying the strength of said urging means for successive operations.

26. In a machine of the class described, an oscillatory table, a slide, a knife carried by said slide and movable therewith toward and from the center of oscillation of said table, means for holding said table spaced from said knife to permit the insertion of work therebetween when said knife is in retracted position and to release said table thereafter, resilient means urging said table toward said knife when said holding means is released to clamp the work between said knife and table and to cause said knife to sink into the work before commencement of its cutting stroke, and means for automatically changing the strength of said resilient means from one to another value alternately for subsequent scarfing operations.

27. In a scarfing machine, scarfing mechanism, and means operating after the completion of a scarfing operation for automatically controlling the subsequent operation of said scarfing mechanism to produce a scarf having a different characteristic.

28. In a scarfing machine, scarfing mechanism, adjustable mechanism for causing said scarfing mechanism to produce scarfs of different characteristics, and means for automatically actuating said adjustable mechanism prior to actuation of the scarfing mechanism and in predetermined sequence to effect predetermined characteristics of the scarf produced by scarfing operations in said sequence.

29. In a scarfing machine, scarfing mechanism, adjustable mechanism for controlling the operation of said scarfing mechanism and varying the characteristics of the scarf to be produced, and means for actuating said adjustable mechanism alternately from one to another condition to produce scarfs of different characteristics on each two successive operations of said scarfing mechanism.

30. In a machine of the class described, mechanism for cutting a scarf in work, and independently adjustable mechanism for determining the thickness of the scarf adjacent opposite ends thereof.

31. In a machine of the class described, mechanism for cutting a scarf in work, independently adjustable mechanism for determining the thickness of the scarf adjacent opposite ends thereof, and means for automatically varying the adjustments of certain of said adjustable mechanisms for subsequent scarfing operations.

32. In a machine of the class described, mechanism for cutting a scarf in work, independently adjustable mechanism for determining the thickness of the scarf adjacent opposite ends thereof, and means for automatically changing certain of said adjustments alternately between two conditions to cause two differently characteristic scarfs to be produced in alternate operations.

33. In a machine of the class described, mechanism for cutting a scarf including adjustable mechanism for determining the thickness of the scarfed portion adjacent its thin end, and means acting automatically to adjust said adjustable mechanism to predetermined positions for subsequent operations.

34. In a machine of the class described, mechanism for cutting a scarf including an adjustable mechanism for determining the thickness of the scarfed portion adjacent its thin end, adjustable mechanism for determining the length of the scarfed portion, and means controlled by the machine for concurrently effecting the adjustment of both mechanisms.

35. In a machine of the class described, mechanism for cutting a scarf including an adjustable mechanism for determining the thickness of the scarfed portion adjacent its thin end, adjustable mechanism for determining the length of the scarfed portion, and means for automatically effecting the adjustment of both mechanisms for subsequent scarfing operations.

36. In a machine of the class described, mechanism for cutting a scarf including an adjustable mechanism for determining the thickness of the scarfed portions adjacent its thin end, adjustable mechanism for determining the length of the scarfed portion, and means for automatically effecting adjustment between two conditions of both adjustable mechanisms alternately for alternate operations.

37. In a machine of the class described, mechanism for cutting a scarf including an adjustable mechanism for determining the thickness of the scarfed portion adjacent its thin end and adjustable mechanism for determining the length of the scarfed portion, means for automatically effecting adjustment between two conditions of both adjustable mechanisms alternately for alternate operations, and means for indicating the particular adjustment for each actuation.

38. In a machine of the class described, mechanism for cutting a scarf, adjustable to produce scarfs of variable length and thickness adjacent their thin ends, and means for automatically adjusting said mechanism to produce comparatively short thin end scarfs and comparatively long thick end scarfs.

39. In a machine of the class described, mechanism for cutting a scarf adjustable to produce scarfs of variable length and thickness adjacent their thin ends, and means for automatically adjusting said mechanism to produce comparatively short thin end scarfs and comparatively long thick end scarfs in alternation.

40. In a machine of the class described, mechanism for cutting a scarf adjustable to produce scarfs of variable length and thickness adjacent their thin ends, means for automatically adjusting said mechanism to produce comparatively short thin end scarfs and comparatively long thick end scarfs in alternation, and means for indicating to the operator when the machine is stopped the adjustment for the next scarfing operation.

41. In a machine of the class described, mechanism for cutting a scarf including adjustable mechanism for determining the thickness of the scarfed portion adjacent its thin end, and means for automatically changing said adjustment alternately between two conditions for subsequent operation to produce in alternation scarfs having comparatively thick and thin ends.

42. In a machine of the class described, scarfing mechanism including adjustable mechanism for determining the length of the scarfed portion, and automatic means for changing the adjustment for successive scarfing operations on the two ends of the same strip of stock.

43. In a machine of the class described, scarfing mechanism including adjustable mechanism for determining the length of the scarfed portion, and means acting automatically to change the adjustment alternately between two conditions for successive operations whereby long and short scarfs are produced alternately.

44. In a machine of the class described, a slide, a knife carried by said slide, a work table toward and from the surface of which the cutting edge of said knife moves on the movement of said slide, a work pressing member carried to move with said slide and also movable toward and from work carried by said table, means acting through said member for first moving said member against the work and then moving said slide to effect a cutting stroke of said knife, and means for adjusting the resistance to the movement of said slide thereby to adjust the pressure of said member against the work.

45. In a machine of the class described, a work table pivoted about an axis in its surface, a slide, a knife carried by said slide and having its cutting edge movable in a plane containing said axis and facing said axis, means for urging said table upwardly about said axis toward coincidence with said knife edge to press work resting on said table against said knife edge, and a roller engageable with the upper face of the work adjacent said knife edge to press the work against said table, said roller being bodily movable with said slide.

46. In a machine of the class described, a work table pivoted about an axis in its surface, a knife carried by said slide and having its cutting edge movable in a plane containing said axis and facing said axis, means for urging said table upwardly about said axis toward coincidence with said knife edge to press work resting on said table against said knife edge, a roller engageable with the upper face of the work adjacent said knife edge to press the work against said table, said roller being bodily movable with said slide, and means for rotating said roller during its bodily movement with said slide.

47. In a machine of the class described, a work table, a slide, a scarfing knife carried by said slide and movable toward and from said table in an inclined direction on movement of said slide, a member movable toward and from said table to press and release work thereon, means to limit the motion of said member away from said table, mechanism acting to move said member against the work and then to move said slide, the resistance to the movement of said slide determining the pressure exerted on the work by said member, and means for imposing an adjustable resistance to the movement of said slide.

48. In a machine of the class described, a work table, a slide, a knife carried by said slide and movable in an inclined direction toward and from the surface of said table, a member carried by said slide and movable toward and from work on said table to hold and release work thereagainst, a stop to limit the work-releasing movement of said member, mechanism for moving said member in its full extent in one direction, and then to move said slide, means for urging said table toward said knife to cause said knife to sink into the work, and means for simultaneously adjusting said urging means and said stop in a manner that a heavier pressure of the work against such knife is associated with a shorter amplitude of motion of said work pressing member and a correspondingly increased length of stroke of said slide and visa versa to produce long thick end scarfs and short thin end scarfs.

49. In a machine of the class described, a work table, a slide, a knife carried by said slide and movable in an inclined direction toward and from the surface of said table, a member carried by said slide and movable toward and from work on said table to hold and release work thereagainst, a stop to limit the work-releasing movement of said member, mechanism for moving said member in its full extent in one direction and then to move said slide, means for urging said table toward said knife to cause said knife to sink into the work, and means for automatically varying said adjustments between determined points in alternation for successive scarfing operations to produce long thick end scarfs and short thin end scarfs in alternation.

50. In a machine of the class described, a work table, a slide, a knife carried by said slide and movable in an inclined direction toward and from the surface of said table, a member carried by said slide and movable toward and from work on said table to hold and release work thereagainst, a stop to limit the work-releasing movement of said member, mechanism for moving said member in its full extent in one direction, means to limit the movement of said work-holding member toward said table, means for urging said table toward said knife to cause said knife to sink into the work, and means for simultaneously adjusting said urging means and said stop in a manner that a heavier pressure of the work against said knife is associated with a shorter amplitude of motion of said work pressing member and a correspondingly increased length of stroke of said slide and visa versa to produce long thick end scarfs and short thin end scarfs, and means coacting with said limiting means to prevent said work-holding member from striking the work at the start of motion of said knife only when the machine is adjusted to form a long thick end scarf.

51. In a machine of the class described, a work table, a knife movable toward and from said table to scarf work thereon, a member movable toward and from the work and with and in advance of the cutting edge of said knife above the work to hold the work against said table, and means acting at certain times to prevent the impingement of said member on the work at the start of the cutting stroke of said knife.

52. In a machine of the class described, a work table, a knife movable toward and from said table to scarf work thereon, a member movable toward and from the work and with and in advance of the cutting edge of said knife above the work to hold the work against said table, and means acting at the start of alternate cutting strokes of said knife to prevent the impingement of said member on the work.

In testimony whereof I have affixed my signature.

HARRY LYON.